United States Patent Office 3,153,575
Patented Oct. 20, 1964

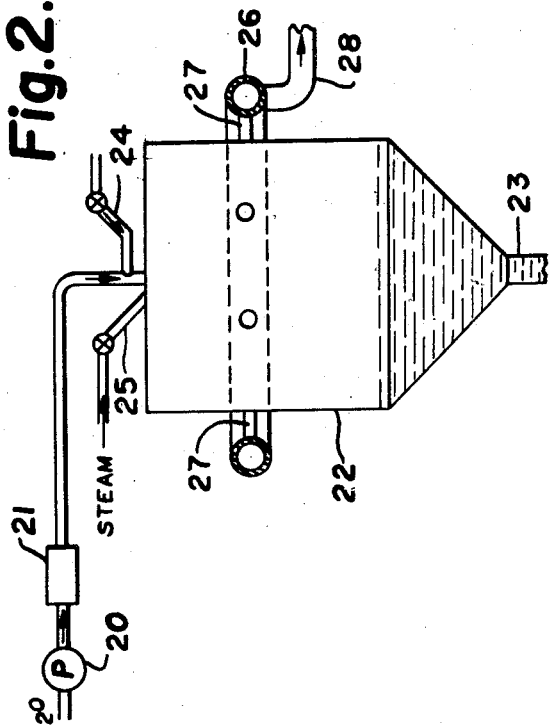
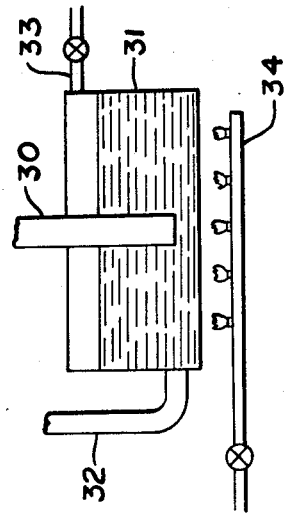
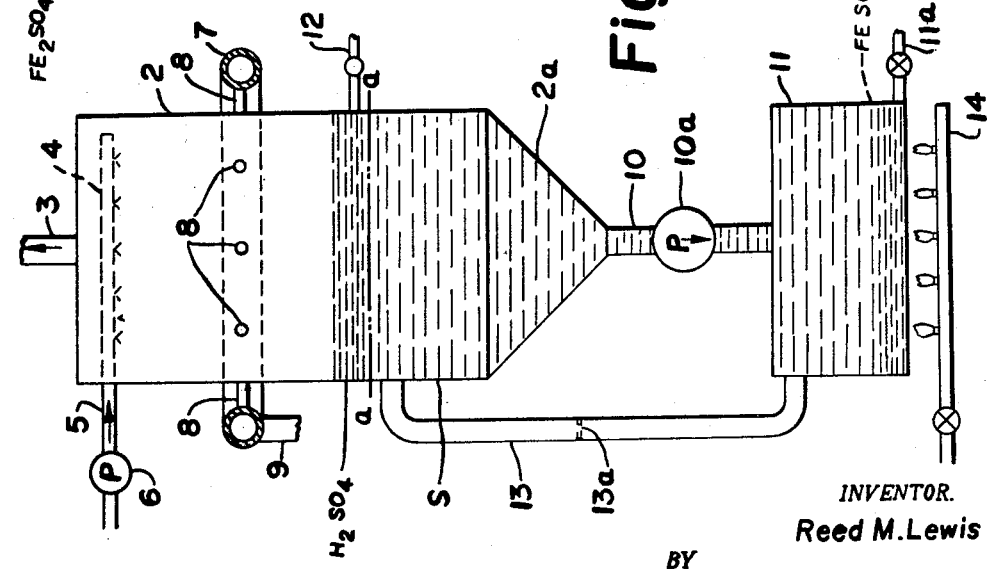

3,153,575
TREATMENT OF SPENT PICKLE LIQUOR AND
PREPARATION OF SULFURIC ACID
Reed M. Lewis, 6644 Kinsman Road, Pittsburgh 17, Pa.;
Elizabeth B. Lewis, executrix of said Reed M. Lewis,
deceased
Filed May 20, 1959, Ser. No. 814,616
12 Claims. (Cl. 23—126)

This invention relates to the treatment of spent pickle liquor which results from the acid cleaning of ferrous metal products. Spent pickle liquor is presently disposed of as a waste material, and the present invention is for the recovery of valuable constituents in the pickle liquor and eliminating the present problem of disposition of the pickle liquor as waste.

Spent pickle liquor produced in the cleaning or pickling of steel or steel products with sulphuric acid contains roughly about 7 to 8% of unreacted sulphuric acid and around 15 to 20% of ferrous sulphate as $FeSO_4 \cdot 7H_2O$. At the present time its disposal presents an item of continuing and increasing expense. Whereas at one time pickle liquor could be discharged into sewers and streams, increasingly strict water pollution measures now require that it be processed to neutralize the acid and eliminate the ferrous sulphate by chemical fixation, or stabilize them against detrimental leaching. Aside from the loss of the sulphur and iron constituents of the pickle liquor, this is an expensive procedure requiring the hauling of the spent pickle liquor to vast dumps where it is treated with lime or other reactants and dumped into areas that become waste land.

Processes heretofore developed for the recovery of the iron and sulphur components from spent pickle liquor have been commercially unsuccessful because of the cost of equipment and maintenance and the cost of operation.

The present invention has for its object to provide a process which requires only simple equipment which may economically recover separately the sulphuric acid and the ferrous sulphate as the monohydrate. The sulphuric acid may be used in the make-up of new pickling solution while the ferrous sulphate monohydrate is in a clean, easily handled condition. The ferrous sulphate is further preferably reacted to yield sulfuric acid and iron oxide as $Fe_2O_3$ and this invention has as a further object the processing of $Fe_2O_3$ with oxygen or oxygen-containing gas and water vapor to yield sulphuric acid and iron oxide.

These and other objects and advantages are secured through the use of my invention as will be more fully apparent to those skilled in the art from the following detailed description in conjunction with the accompanying drawings, in which:

FIG. 1 is a schematic diagram depicting the first stage of the operation;

FIG. 2 is a similar view of the second stage; and

FIG. 3 is a fragmentary view of the lower part of the apparatus of FIG. 1 to effect a modified procedure.

Referring to FIG. 1, 2 designates a liquid-gas contact apparatus, preferably a cylindrical enclosed spray tower of a suitable height and diameter having an offtake pipe 3 leading from the upper end thereof. There is a spray pipe 4 in the upper portion of this tower connected with a pipe 5 and a pump 6. The pump is connected to a source of spent pickle liquor (not shown). The pickle liquor is forced by the pump into spray nozzle and discharged under pressure into the interior of the spray tower as a fine spray.

Surrounding the tower between the top and bottom is a bustle pipe or manifold 7 from which lead a plurality of radial ducts or tuyeres 8 that open at intervals into the interior of the tower. Hot gases, preferably waste hot gases, such as stack gases from a blast furnace stove, open hearth furnaces, or other fuel burner, are supplied to the bustle pipe through a duct 9, the source of the hot gases not being shown.

The tower has a conical bottom portion 2a that terminates in a central duct or section 10 of much smaller diameter than the tower, and which opens into an enlarged chamber 11. There is a draw-off pipe 11a at the bottom of chamber 11, and there is also a draw-off pipe 12 at a level in the main tower above the conical bottom and below the bustle pipe. An external circulation is provided by a loop which leads from the chamber 11 into the tower 2 below the level of the pipe 12. A separate heater for the chamber 11 is indicated at 14. There may be a pump 10a for circulating liquid from the lower end of the tower, through duct 10 and into chamber 11 and back to the tower through pipe 13. For reasons hereinafter explained, this pump is preferably in duct 10, but could be located in pipe 13.

In operation, a body of molten sulphur is maintained in the lower part of the tower 2 to the level roughly indicated by a line $a$—$a$ below the level of drawoff pipe 12. The sulphur is maintained at a temperature above its melting point, the temperature of the sulphur in the tower being between 250° F. and 530° F., and at about 572° F. in the chamber 11, the latter temperature being above the melting point of iron sulphate monohydrate $(FeSO_4 H_2O)$ and below its boiling point under greater than atmospheric pressure.

The spent pickle liquor is sprayed into the upper part of the spray chamber as a fine mist, having been first filtered before entering the spray pipe to remove solids. The water in the pickle liquor is evaporated by the continuous supply of hot stack or other gases introduced through the tuyeres 8, and the steam and waste gases leave the top of the tower through outlet 3. Temperature maintained in the spray tower space may range between 250° and 530° F., which is below the boiling point of concentrated sulphuric acid. The heat of the gases concentrates the sulphuric acid and converts the ferrous sulphate in the solution to the monohydrate. The sulphuric acid, which has a lower specific gravity than the sulphur, collects on top of the molten sulphur, while the iron sulphate monohydrate, being heavier, sinks through the molten sulphur and accumulates in the bottom of the chamber 10 where it is maintained at a temperature at which it is molten or liquid, but below its boiling point. By maintaining an adequate depth of molten sulphur to create a desired hydrostatic pressure, the temperature difference between the melting temperature and boiling temperature of the monohydrate may be increased, and additional pressure may, if necessary, be provided by the pump 10a, in which case a restrictive orifice 13a may be provided in pipe 13.

The concentrated sulphuric acid thus separated from the original liquor may be drawn off through tap 12. The molten monohydrate which is free of sulphuric acid and is clean can be withdrawn through draw-off pipe 11a. It can then be cooled to be subsequently roasted or otherwise treated to recover iron oxide and $SO_2$ gas.

However, I prefer that the molten monohydrate withdrawn from pipe 11a be forced by a pump 20 (FIG. 2) through a heater 21 to heat it to the needed temperature, and it is then introduced as a spray or vapor into the top of a pressure vessel 22. This vessel has a conical bottom with a dump valve 23 at the discharge thereof. Highly heated oxygen, air, or air enriched with oxygen is also forced under pressure into vessel 22 through pipe 24 from a source not shown, the oxygen entering with the $FeSO_4H_2O$ to atomize it. Steam may be introduced through pipe 25.

A bustle pipe or manifold 26 encircles the vessel between its top and bottom, and radial pipes 27 lead from the interior of vessel 22 into the bustle pipe 26. A discharge duct 28 leads away from the bustle pipe.

The temperature in vessel 22 should be of the order of 814° F., this being the most advantageous temperature for the stability of $SO_3$, and at which disassociation of the iron sulphate monohydrate will occur, resulting in the formation of iron oxide as $Fe_2O_3$ and $SO_3$ and the combination of the $SO_3$ and $H_2O$ to produce sulphuric acid vapor. This vapor is drawn off through pipes 27, 26 and 28. It is known that ferrous sulphate when heated in the absence of air is unstable and the dissociation is expressed by the reversible formula:

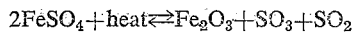

$$2FeSO_4 + heat \rightleftharpoons Fe_2O_3 + SO_3 + SO_2$$

It is also known that finely-divided iron oxide functions as a catalyst in the conversion of $SO_2$ to $SO_3$ in the presence of oxygen. If the reaction in vessel 22 is incomplete the vapors and gases can be carried to a conventional sulphuric acid reactor for completing the reaction. The iron oxide as a finely divided solid collects in the bottom of the vessel 22 and may be removed through dump valve 23 at intervals. The reaction in vessel 23 may be indicated as follows:

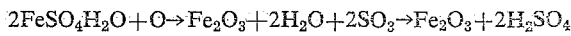

$$2FeSO_4H_2O + O \rightarrow Fe_2O_3 + 2H_2O + 2SO_3 \rightarrow Fe_2O_3 + 2H_2SO_4$$

Stoichiometric proportions of oxygen are used, but water in the form of steam is preferably in excess of the required amount to reduce somewhat the concentration of the acid and facilitate the reaction, and also for purposes of temperature control.

While I have illustrated one form of apparatus, it may be otherwise arranged and designed. Little mechanism having moving parts is required, and it can be provided with controls for rendering the process largely automatic. The molten sulphur used as a separating medium in the first stage of the process avoids much of the difficulty encountered in previous processes of separating the acid and monohydrate. It provides a clean separation without filters or similar equipment now required.

Having secured the iron sulphate monohydrate as a molten liquid, it may be readily transferred to the second stage out of contact with air to the acid generator shown in FIG. 2. The sulphur and iron components of the pickle liquor are economically recovered, waste heat may be utilized, and the water carried off as steam is entirely innocuous. The particular form of apparatus shown in FIG. 1 where a pipe or duct connects the vessel 2 with the chamber 11 provides a desired hydrostatic pressure without excessive volumes of sulphur and makes temperature control more responsive. The arrangement also enables the sulphur in the chamber 11 to be at a higher temperature than that in vessel 2. While the invention is especially applicable to the treatment of pickle liquor, it may be used for the treating of any aqueous solution of iron sulphate with sulphuric acid therein.

In FIG. 3 I have shown a modification of the apparatus shown in FIG. 1 by which either of two alternate procedures may be practiced. In this figure the upper part of the apparatus is the same as that shown in FIG. 1, but the pipe 10 is replaced by pipe 30 which extends well down into the vessel 31 corresponding to vessel 11. Circulating pipe 32, corresponding to 13, exits from near the bottom of the vessel 31 instead of near the top, and there is a draw-off pipe 33 leading from the top of the vessel 31. A similar burner or heating means for vessel 31, corresponding to 14, is indicated at 34.

In the first of the alternate procedures above mentioned molten sulphur is used in the lower part of the tower and in vessel 31 as described in FIG. 1, but the temperature in vessel 31 is above the boiling temperature of $FeSO_4H_2O$ so that the ferrous sulphate is vaporized and withdrawn through pipe 33 as a vapor instead of as a liquid, as described in FIG. 1.

In the second of these two alternate procedures, the sulphur is omitted and there is concentrated sulphuric acid in the bottom of the tower and vessel 31. It has a specific gravity of 1.9592, while the ferrous monohydrate has a specific gravity of 2.9. The ferrous sulphate monohydrate which is precipitated by concentration of the pickle liquor sinks to the bottom of the tower and down the pipe 30 into vessel 31. Concentrated sulphuric acid boils at 592° F. while the ferrous monohydrate melts and boils at 572° F. The sulphuric acid in vessel 31 may therefore be heated to a temperature between 572° F. and 592° F., say 585° F., and the ferrous sulphate removed as vapor through pipe 33 as above described. A variation of this procedure would be to use the apparatus of FIG. 1 and draw the ferrous monohydrate off as liquid, keeping the sulphuric acid at a temperature where the monohydrate is liquid and a pressure where it does not vaporize.

In any of the above procedures, the pickle liquor is concentrated and gravity separation of the acid and ferrous sulphate effected and the ferrous sulphate heated to at least its melting point, which at atmospheric pressure is also its boiling point and the ferrous sulphate is drawn off as a fluid, either molten or vapor.

I claim:

1. The method of treating waste pickle liquor which comprises concentrating the liquor and discharging the concentrate into a vessel incompletely filled with a body of hot liquid, the hot liquid being of a specific gravity lower than the specific gravity of ferrous sulphate monohydrate and at least as great as the specific gravity of concentrated sulphuric acid and with which the sulphuric acid does not react and effecting within the said body of hot liquid gravity separation of the ferrous sulphate from the sulphuric acid, maintaining the lower portion of the body of hot liquid at a temperature at least as high as the melting temperature of the ferrous sulphate and below the boiling temperature of concentrated sulphuric acid, and withdrawing the ferrous sulphate from the vessel containing the body of hot liquid as a fluid.

2. The method of treating pickle liquor as defined in claim 1 in which concentration of the pickle liquor is effected by spraying the liquor into said vessel above the body of hot liquid and circulating heated gases through the vessel above the body of hot liquid at a temperature below the boiling point of concentrated sulphuric acid at a temperature to vaporize water from the pickle liquor and over the body of hot liquid in the vessel.

3. The method of treating pickle liquor as defined in claim 1 in which the body of hot liquid is molten sulphur.

4. The method of treating pickle liquor as defined in claim 1 in which the body of hot liquid is concentrated sulphuric acid.

5. The method of treating pickle liquor as defined in claim 1 in which the temperature in the lower part of the vessel is above the boiling point of ferrous sulphate monohydrate and the monohydrate is withdrawn as a gaseous fluid.

6. The process of treating waste pickle liquor which comprises evaporating water therefrom and collecting the concentrate in a bath of molten sulphur maintained at a temperature below the boiling point of concentrated sulphuric acid whereby the acid in the pickle liquor floats above the molten sulphur and the sulphate as the monohydrate sinks to the bottom.

7. The method of treating waste pickle liquor as defined in claim 6 in which the temperature at the bottom of the bath is such that the iron sulphate monohydrate is liquid but below the boiling point of the monohydrate.

8. The process of treating waste pickle liquor containing $FeSO_47H_2O$ and $H_2SO_4$ in an aqueous solution which comprises spraying the pickle liquor into a space within a closed environment through which hot gases are circulated to maintain a temperature in said environment between about 250° F. and 530° F. to evaporate water therefrom and transform the iron sulphate to the monohydrate, maintaining a body of molten sulphur at a temperature below the boiling point of concentrated sulphuric acid in said environment, said body of molten sulphur being confined in said environment below the space in which said hot gases are circulated, any sulphuric acid remaining on the surface of the sulphur and iron sulphate monohydrate sinking to the bottom of the sulphur.

9. The process of treating waste pickle liquor containing $FeSO_4 7H_2O$ and $H_2SO_4$ in an aqueuous solution which comprises spraying the pickle liquor into a space within a closed environment through which hot gases are circulated to maintain a temperature in said environment between about 250° F. and 530° F. and simultaneously evaporating water therefrom and transforming the iron sulphate to the monohydrate, maintaining a body of molten sulphur in said environment below the space through which the hot gases circulate and into which sprayed material, after passing through the hot gases, falls, any sulphuric acid in the sprayed material remaining on the surface of the sulphur and iron sulphate monohydrate in the sprayed material sinking to the bottom of the sulphur, the temperature of the molten sulphur at the top being below the boiling point of the sulphuric acid and the temperature of the sulphur at the bottom of the body of molten sulphur being sufficient to melt the iron sulphate monohydrate, and withdrawing the monohydrate from below the body as a fluid at a temperature above its melting temperature.

10. The method of treating waste sulphuric acid pickle liquor and recovering sulphuric acid and iron oxide therefrom which comprises concentrating and heating the spent pickle liquor and reducing the ferrous sulphate heptahydrate to $FeSO_4 H_2O$ and discharging the concentrate into the upper portion of a vessel incompletely filled with a hot liquid, the hot liquid having a temperature above the melting point of $FeSO_4 H_2O$ and below the boiling point thereof at atmospheric pressure and having a specific gravity lower than the specific gravity of ferrous sulphate monohydrate and greater than the specific gravity of concentrated sulphuric acid and with which sulphuric acid and $FeSO_4 H_2O$ have no reaction and are immiscible therewith, effecting within said body of hot liquid the gravity separation of ferrous sulphate monohydrate and sulphuric acid contained in the hot concentrated pickle liquor, withdrawing the sulphuric acid from above the hot liquid, maintaining the lower portion of the body of hot liquid at a temperature above the boiling temperature of ferrous sulphate monohydrate at atmospheric pressure, collecting the ferrous sulphate monohydrate which gravitates through the hot liquid below the liquid bath where it is protected from contact with air and is under the hydrostatic pressure of the overlying liquid, withdrawing the monohydrate through a closed conduit and while it is still hot subjecting it to increased heat and discharging it hot as a gas into a heated environment and by such heating and pressure effecting the reaction $$2FeSO_4 H_2O + heat \rightleftarrows Fe_2O + SO_3 + SO_2 + H_2O$$

and introducing oxygen into said heated environment to produce sulphuric acid, the ferric oxide so produced in comminuted form acting as a catalyst for the conversion of $SO_2$ to $SO_3$ and subsequently recovering from said environment the sulphuric acid and ferric oxide.

11. The method of treating waste pickle liquor and recovering sulphuric acid and iron oxide therefrom as defined in claim 10 wherein the hot liquid is molten sulphur.

12. The method of making sulphuric acid which comprises heating ferrous sulphate monohydrate while it is protected from contact with air and under pressure to a temperature above the normal boiling temperature of the ferrous sulphate monohydate at atmospheric pressure, such heating being effected under sufficient temperature to prevent the boiling of the ferrous sulphate monohydrate, thereafter discharging the heated ferrous sulphate monohydrate as a vapor into a closed environment maintained at a temperature sufficient to effect dissociation of the ferrous sulphate monohydrate into ferric oxide on the one hand and $SO_2$ and $SO_3$ gases and steam on the other, maintaining said products at a temperature not substantially lower than 814° F., introducing into said environment oxygen, the oxygen reacting in said environment in the presence of ferric oxide with the $SO_2$ and $SO_3$ gases to form sulphuric acid, and withdrawing from said environment sulphuric acid and ferric oxide.

References Cited in the file of this patent

UNITED STATES PATENTS

| 267,582 | Phelps et al. | Nov. 14, 1882 |
| 724,251 | Blackmore | Mar. 31, 1903 |
| 1,276,377 | Klink | Aug. 20, 1918 |
| 1,655,019 | Mantius | Jan. 3, 1928 |
| 2,005,120 | Whetzel et al. | June 18, 1935 |
| 2,078,088 | Mantius | Apr. 20, 1937 |
| 2,098,056 | McBerty | Nov. 2, 1937 |
| 2,185,095 | Smith et al. | Dec. 26, 1939 |
| 2,322,134 | Hodge | June 15, 1943 |
| 2,344,408 | Kalous | Mar. 14, 1944 |
| 2,394,579 | Ayers | Feb. 12, 1946 |
| 2,773,743 | Fackert | Dec. 11, 1956 |

OTHER REFERENCES

Mellor: Inorganic and Theoretical Chemistry, vol. 10, pages 362, 378, vol. 14, page 256.